United States Patent [19]

Gasior

[11] 4,032,271
[45] June 28, 1977

[54] HOT PELLET TRANSFER APPARATUS
[75] Inventor: Joseph Gasior, Bloomfield, N.J.
[73] Assignee: Midland-Ross Corporation, Cleveland, Ohio
[22] Filed: Nov. 3, 1975
[21] Appl. No.: 628,067
[52] U.S. Cl. .................... 425/10; 264/14
[51] Int. Cl.² ...................... B22D 23/08
[58] Field of Search ............. 425/10; 264/14
[56] References Cited

UNITED STATES PATENTS

| | | | |
|---|---|---|---|
| 1,698,505 | 1/1929 | Marlatt et al. | 264/14 X |
| 2,543,132 | 2/1951 | Shabaker | 264/14 X |
| 2,774,660 | 12/1956 | Cook et al. | 264/14 |
| 2,875,473 | 3/1959 | Mitchell et al. | 264/14 |
| 3,042,970 | 7/1962 | Terenzi | 264/14 X |
| 3,272,893 | 9/1966 | Mogensen | 264/14 X |
| 3,550,195 | 12/1970 | Campbell | 425/10 |

FOREIGN PATENTS OR APPLICATIONS 1,244,441  9/1960  France ..................... 425/10

Primary Examiner—Robert L. Spicer, Jr.
Attorney, Agent, or Firm—Woodrow W. Portz

[57] ABSTRACT

Disclosed herein is apparatus (1) for suspending hot sticky pellets discharged from a pelletizer into a swirling bath of liquid, (2) for transportation of the resulting slurry to a liquid and pellet separator in a manner which avoids agglomeration of the pellets, and (3) for recycling the liquid through the foregoing steps.

6 Claims, 7 Drawing Figures

HOT PELLET TRANSFER APPARATUS

BACKGROUND OF THE INVENTION

Immediately after cutting plastic materials in heated fluid condition into pellets by equipment, such as described in U.S. Pat. No. 3,753,637, the essential problem is not only to cool the pellets but to handle them during cooling without permitting any opportunity to stick together until they are sufficiently cool and dry as to be mutually non-adhereable under ordinary conditions of storage and commercial transit. Agglomeration of pellets while in a tacky condition is a constant hazard under present commercial processes of hot-pelletizing. Hence, it is an essential object of this invention to provide process and apparatus by which heat sensitive potentially-agglomerative pellets may be obtained in a cooled, dry mutually non-adhereable, separated condition in which the pellets may be packaged, stored or transported.

SUMMARY OF THE INVENTION

The present invention is to be found essentially in an apparatus for processing hot thermoplastic pelletized material which may include, at the upstream end of the process, any suitable equipment for producing a stream of hot separated, but readily mutually adhereable pellets directed in a downward direction. As an essential feature of the invention, the apparatus further includes a receiver or gathering device having an interior upwardly diametrically-expanding funnel surface terminating in a top opening of a size adapted to receive the stream of pellets, and a liquid conductor joining with the receiver in tangential relation with the upper part of the funnel surface. Liquid supplied to the funnel surface through the liquid conductor enters the surface at a rate and direction which will form a solid or full-contiguous sheet of liquid extending from the junction of the liquid conductor with the top portion of the funnel surface to the bottom opening of thereof. The bottom opening is of sufficient size to enable prompt drainage of a slurry comprising the sheet of liquid and any pellets suspended therein to thus avoid any substantial pile up of the slurry at the bottom of the surface.

To assure that there will be no joining of tacky pellets as they leave the funnel surface, a preferred device for forwarding the slurry to other portions of the apparatus is venturi ejector having its suction chamber connected with the bottom opening of the funnel surface and its center nozzle adapted for connection to a liquid pressure source.

According to another aspect of the invention, the apparatus includes any suitable liquid propulsion means for forwarding the slurry from the funnel surface, a liquid-solid separator for receiving the slurry and separating the liquid from the pellets, and liquid conducting means for transferring the liquid from the separator to the pellet receiver. As an additional feature of the invention, means for conducting the slurry from slurry propulsion means adjacent to the receiver is of a length suitable for effecting such cooling of the pellets in the slurry as to render them mutually non-adhereable within the separator.

DESCRIPTION OF PREFERRED EMBODIMENTS

Figure 1:
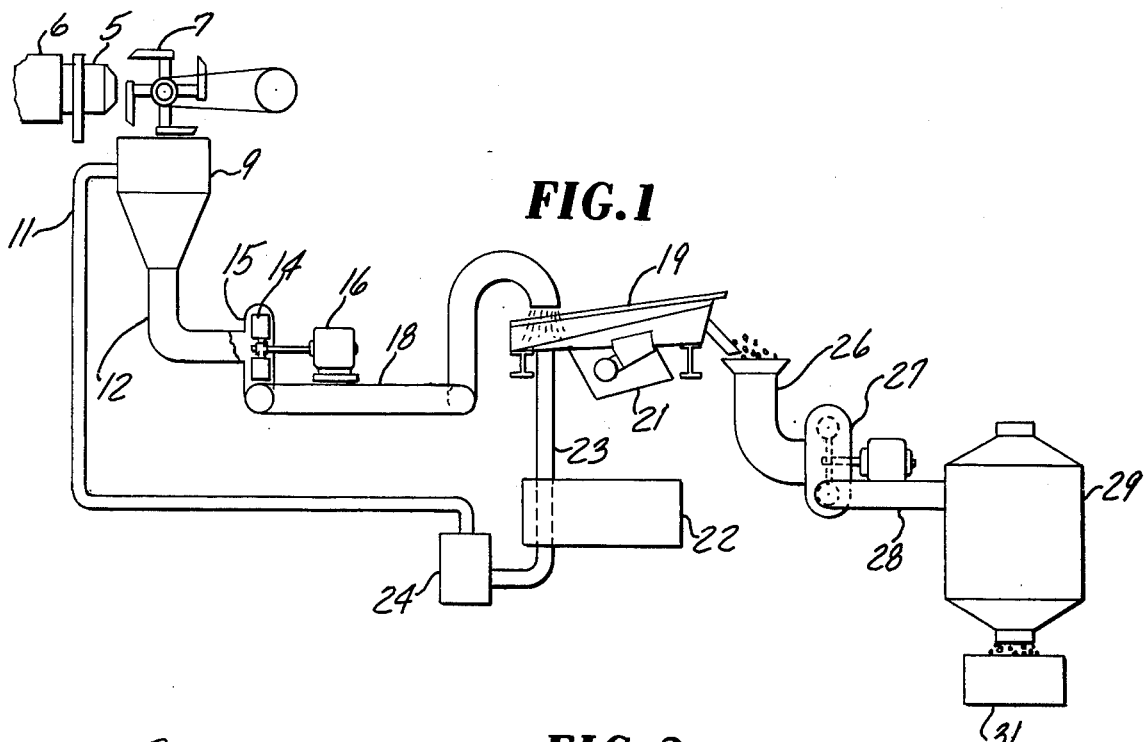
FIG. 1 is a schematic elevation of pelletizing equipment including the apparatus of the invention for processing hot freshly cut pellets to a dry cooled condition.

FIG. 1 illustrates schematically a complete system for manufacturing pellets from a continuous stream of melted resin to a cool, dry pelletized condition wherein a thermoplastic composition is extruded from a die 5 of the extruder 6 into the surface of revolution of a cutter 7. The cutter or pelletizer 7 produces a downward stream of pellets into a collector 9 providing an interior funnel surface. A strong stream of water, or other suitable liquid, is discharged approximately horizontally along a tangent to the inner surface of collector 9 from a conduit 11 to produce a sheet of water, usually several inches thick, circulating along the inner surface of the collector 9. The incoming pellets thrown downwardly by the cutter from the face of the die 5 enter the swirling body of water and form a slurry therewith which passes downward from the bottom opening of the receiver 9 into a conduit 12 connected with a liquid propulsion device such as the impeller 14 of a centrifugal pump 15 driven by a motor 16. The slurry is thus propelled through a conduit 18 to a shaker screen device 19 operated by a power unit 21. The great bulk of the water of the slurry is separated within device 19 and conducted to a reservoir or cooling tank 22 through a conduit 23. A pump 24 connected with the tank returns the water to the collector 9 through conduit 11.

The water passing from the tank 22 and discharged into the collector 9 is much cooler than the pellets in nearly molten condition passing thereinto from the extruder die 5. The vigorous circulation of water relative to pellets within the slurry thereof from the moment the slurry is formed within the collector until it is discharged onto the screen of the device 19 rapidly cools the pellets to a hardened non-tacky state as they are received on the shaker screen of the separator 19. The slurry pump discharge tube 18 can be made of sufficient length, such as by coiling, to provide transit time therethrough to assure such cooling of the pellets that they will not be tacky and tend to adhere to one another when discharged onto the shaker screen. It is preferred, that the pellets received on the shaker screen are cooled only to the extent that they still retain sufficient heat which contributes substantially to vaporization of any film of water remaining on the pellets after passing from the separator 19.

As shown, the pellets, in wet condition, are discharged from the shaker screen device 19 onto the hopper 26 of a pneumatic blower 27. The pellets in damp condition are discharged from the blower to a tube 28 into a standard cyclone collector 29 wherein the air removes the residual dampness of the pellets which issue from the collector, e.g., into a drum 31 in preparation for any storage, use, or shipment.

Figure 2:
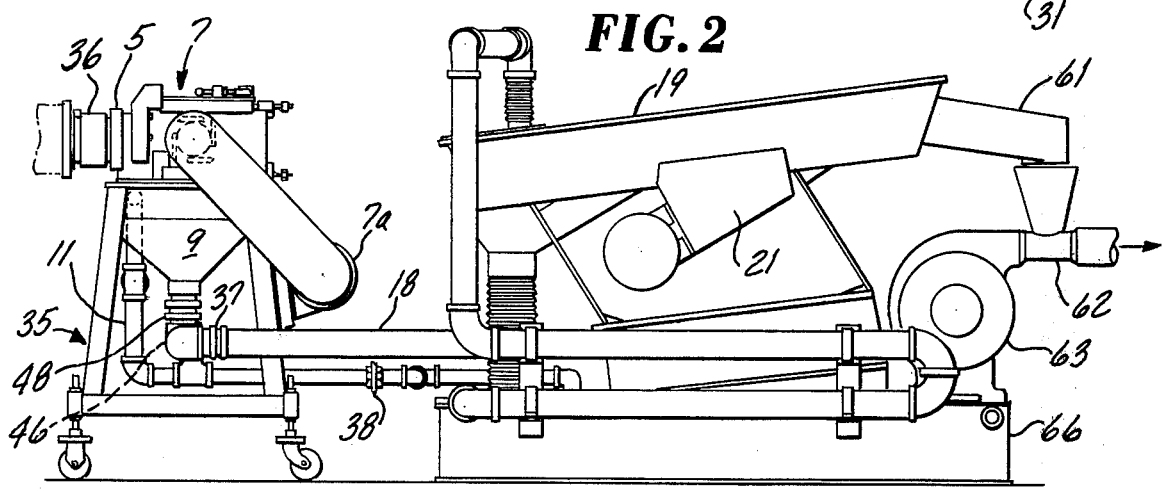
FIG. 2 is a side elevation of modified apparatus for processing hot sticky pellets to a dry cool state in somewhat greater detail.
Figure 3:
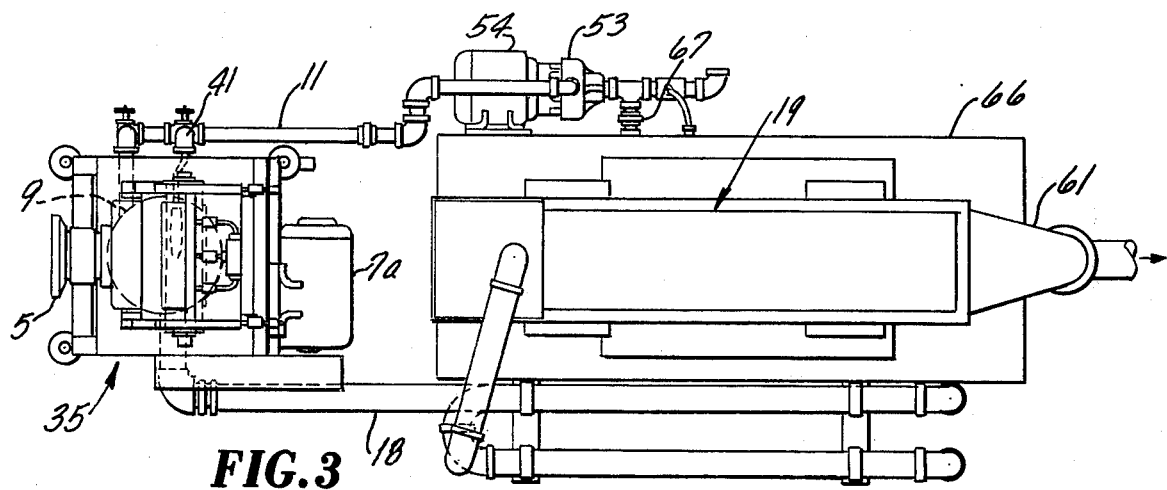
FIG. 3 is a plan view of the apparatus shown in FIG. 2.
Figure 4:
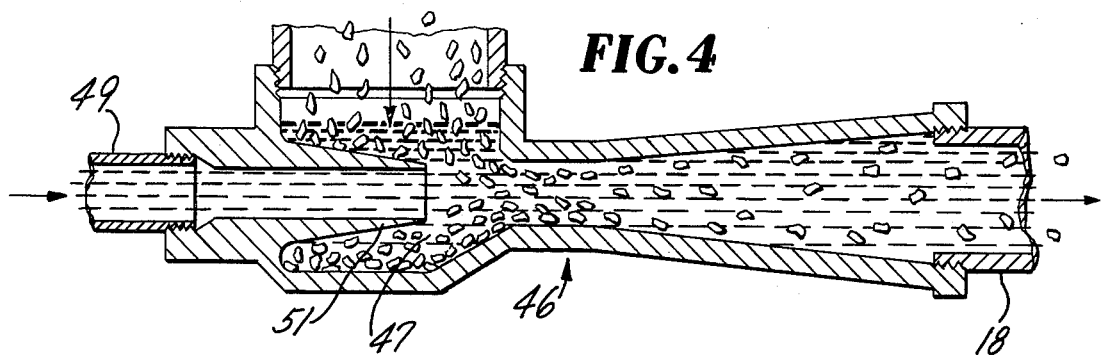
FIG. 4 is an axial longitudinal cross section of a venturi ejector suitable for the practice of the invention.
Figure 5:
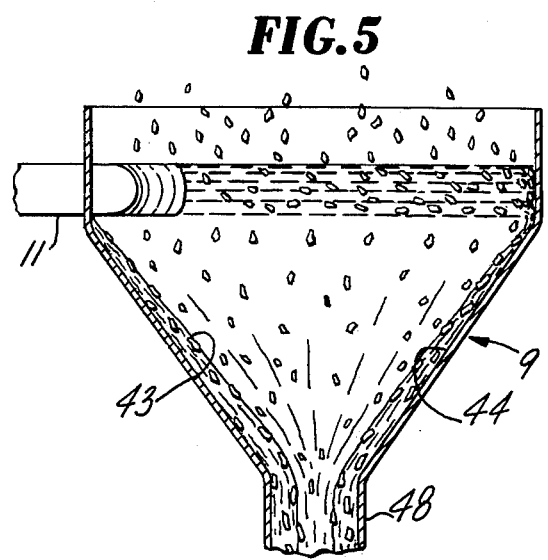
FIG. 5 is a side elevation of an arrangement for a hot pellet receiver, a tangential liquid conductor, and the water supply system therefor.
Figure 7:
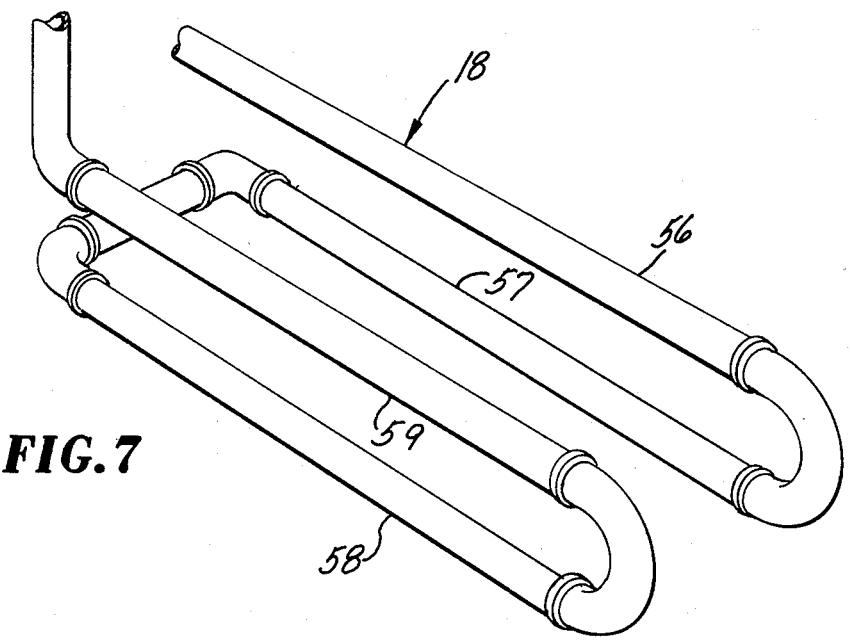
FIG. 7 is a fragmentary perspective view of slurry cooling tubes.

FIGS. 2 and 3 are side elevation and plan views of equipment generally equivalent to that shown in FIG. 1 but illustrating some minor modification. FIGS. 2, 3 and 4 illustrate that the collector 9 and the cutter 5 are mounted on a castor-equipped carriage 35 which may be separated from the shaker screen 19 and the die 5 by quick disconnect couplings 36, 37 and 38. The cutter 7, driven by a motor 7a, is of the type disclosed in U.S. Pat. No. 3,753,737. The water supply line 11 is manifolded to provide line 41 which supplies spray water to the interior of the cutter needed for lubricating the cutting surfaces of the blades thereof. The collector 9 is shown also in FIG. 5 in cross section to illustrate the shape and formation of the slurry body 43 of water and pellets along the inner funnel surface 44 of the collector. It is to be noted that water with pellets suspended therein takes the form of a fully-contiguous sheet which substantially covers the inner surface of the collector 9. This is a desired mode in the operation of the collector since the pellets in residence within the collector are received in a highly tacky condition conducive to agglomeration. Consequently, water is introduced into the collector at a rate which maintains the water in the form of swirling vortex which is effective in keeping the hot pellets from sticking to the surface 44 and to each other.

Figure 6:
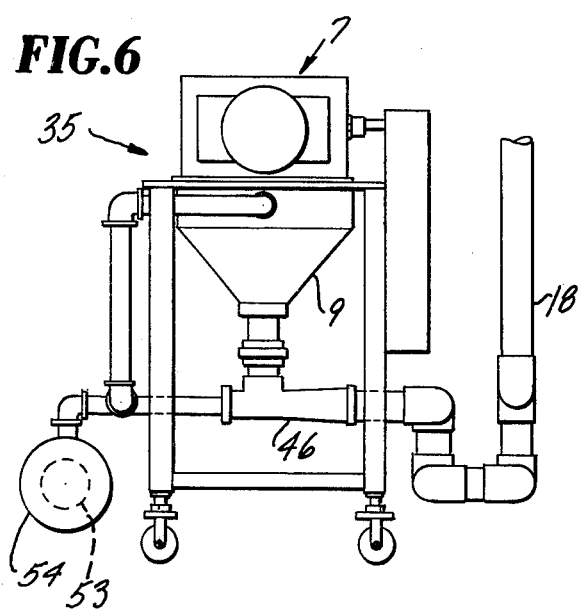
FIG. 6 is a fragmentary elevation of pelletizing equipment illustrating primarily a module unit comprising a pellet and liquid collecting funnel device and a venturi ejector for slurry propulsion.

As shown in FIG. 4, the collector 9 of FIGS. 2 and 3 is connected directly to a venturi ejector 46. More specifically, the bottom opening of the collector is connected directly to the suction chamber 47 of the ejector by a drain tube 48. The inlet duct 49 of the center nozzle 51 of the ejector may be connected to any high pressure water source, e.g., to line 11 assuming that the pump 53 associated with the motor 54 is operated at sufficiently high pressure to satisfy the needs of the collector, the pelletizing cutter 7 and the ejector. As shown in FIG. 6, the pump-motor unit 53,54 may be attached to the carriage 35.

In preventing any agglomeration of pellets, the ejector 46 has the advantage of subjecting the incoming slurry to a high velocity jet issuing from the internal nozzle 51 which effectively adds more water to the slurry issuing from the collector 9 to space the pellets within the resultant liquid stream forwarded through line 18 to the liquid and pellet separator, i.e., shaker screen 19.

As shown in FIG. 6, line 18 may assume the sinuous or circuitus form shown to attain sufficient length of piping in which to accomplish sufficient cooling of the pellets to a non-tacky condition before they arrive at the shaker screen. As one cooling tube configuration, tube 18 comprises advance and reverse passes 56,57,58,59 joined in the series to attain adequate cooling of the slurry before separation of the pellets from the liquid. The tubing may be coiled or the passes may be changed in length or increased in number to obtain heat exchange relation with another fluid in ways well known to the heat exchanging art to attain a desired temperature reduction of the slurry passing therethrough.

In the separation of water from the pellets, pellets issue from the separator 19 through an exhaust duct 61 into a tube 62 through which passes a high velocity current of air exhausted by a blower 63. The mixture of pellets and air advances through the tube 62 to other drying apparatus such as the vortex collector 29.

Water separated from the pellets in the device 19 passes therefrom through a drain duct 65 into the holding tank or reservoir 66 to which the pump 53 is connected through connection 67. While storage in the tank 66 has a cooling effect on the water to be recirculated to the collector 9 and the ejector, a heat exchanger (not shown) may be easily installed within the tank for the purpose of further cooling the liquid therein. The pump 53 forwards water through the return line 11 to the receiver 9 (also to the cutter 7) as hereinfore described. Cold water addition for cooling the slurry is an option.

Thus, apparatus as described as above is especially adapted for producing dry non-tacky pellets from a potentially thermoplastic material. Such production involves the steps of cutting a melted fluidous stream of extrudate, issuing, e.g., from a device such as the extruder 6, by a cutting device such as the cutter 7, operating to direct separated pellets in a downward stream into the funnel-shaped region defined by the collector 9. The process is further practiced by charging a liquid tangentially into the top of the funnel-shaped region in collector 9 to form a spirally descending layer of liquid of sufficient volume to substantially space the pellets from each other within the resulting slurry.

As the slurry drains from the funnel-shaped region, it must be pumped without impingement of the still tacky pellets to a liquid separator by a pumping device which will avoid adherence of the pellets to the parts of the device and to each other. Highly efficient for this purpose is the venturi ejector 46 which receives the pellets into its suction chamber and pumps the pellets through action of a liquid fed thereinto to the liquid-pellet separator 19. The slurry is confined within a conduit such as the tube 18 of sufficiently restricted cross section to cause the slurry to move rapidly. The tube 18 is formed of components providing a smooth inner surface. The pellets are maintained in suspension while being cooled through a suitable length of the tube to reduce the pellets to a non-tacky state as they arrive at the station for separating the liquid from the pellets. Once separated from the pellets, the liquid is advantageously returned to the funnel shaped layer of swirling liquid formed by the collector 9.

What is claimed is:

1. Apparatus for processing hot thermoplastic pelletized material comprising:
   pelletizing means for producing a stream of separated hot mutually-adhereable pellets of said material, and directing said stream in a downward path;
   funnel means defining an interior upwardly diametrically expanding funnel surface terminating in a top opening of a size adapted to receive said stream of said pellets;
   first liquid-conducting means for directing liquid in a stream aligned tangentially with an upper part of said funnel surface;
   supply means associated with said liquid-conducting means for effecting a rate of discharge and direction of liquid from said liquid-conducting means which maintains a spirally descending fully-contiguous sheet of liquid substantially covering said surface;
   said funnel surface terminating in a bottom opening of sufficient size and said apparatus comprising means for withdrawing the resulting slurry comprising said sheet of liquid and any pellets suspended therein to effect such prompt drainage of the slurry from the funnel means as to maintain said sheet of liquid along said surface without substantial pile up of liquid at the bottom of the surface.

2. The apparatus of claim 1 wherein: said withdrawing means comprises a venturi ejector having its suction chamber connected with said bottom opening at its center nozzle means adapted to be connected to a liquid pressure source.

3. The apparatus of claim 1 wherein: said withdrawing means comprises first liquid propulsion means having intake means arranged to receive said slurry from said funnel surface and exhaust means for discharging said slurry and said apparatus further comprises;
- a liquid pellet-separating means;
- a second liquid-conducting means connected to and extending between said exhaust means and said separating means; and
- return line and second liquid propulsion means connected with said separating means to receive liquid therefrom and connected in supply relation with said first liquid-conducting means.

4. The apparatus of claim 3 wherein:
said first propulsion means is a venturi ejector having its suction chamber connected with said bottom opening and its center nozzle connected with liquid pressure means.

5. The apparatus of claim 3 wherein:
said first propulsion means is a venturi ejector having its suction chamber connected with said bottom opening, and
said return line and second propulsion means is connected also in supply relation with center nozzle as a liquid pressure source therefor.

6. The apparatus of claim 3 wherein:
said second liquid conducting means places said slurry in heat exchange relation with a surrounding fluid medium and the length thereof is variable to effect a desired reduction in the temperature of said slurry leaving said funnel means.

* * * * *